May 22, 1956  R. BINDER  2,746,585
CENTRIFUGAL CLUTCHES

Filed Nov. 22, 1954  2 Sheets-Sheet 1

INVENTOR
Richard Binder
By:
Michael S. Striker
agt.

May 22, 1956   R. BINDER   2,746,585
CENTRIFUGAL CLUTCHES

Filed Nov. 22, 1954   2 Sheets-Sheet 2

INVENTOR
Richard Binder
By:
Michael S. Striker
agt.

United States Patent Office 2,746,585
Patented May 22, 1956

2,746,585
CENTRIFUGAL CLUTCHES

Richard Binder, Schweinfurt (Main), Germany, assignor to Fichtel & Sachs A. G., Schweinfurt (Main), Germany Application November 22, 1954, Serial No. 470,426

Claims priority, application Germany November 20, 1953

10 Claims. (Cl. 192—48)

The present invention relates to centrifugal clutches of the type used, for example, in motor driven vehicles.

Centrifugal clutches of the above type are well known and they operate in a fully automatic manner transmitting the drive from the engine to the wheels when the engine rotates at a speed above its idling speed. However, such clutches have the disadvantage of not providing any connection between the engine and wheels at speeds below the idling speed. Such a connection between the engine and wheels is very desirable so that the engine may be used as a brake either when the vehicle is stationary or parked on a hill, for example.

This defect of centrifugal clutches has been recognized, and in order to overcome this defect it has been proposed to provide a means such as pawls and a ratchet wheel for interconnecting the driving and driven members of the clutch when the engine rotates at a speed below that at which the centrifugal clutch becomes engaged. This solution to the problem, however, has proved to be unsatisfactory because the pawls move very suddenly into engagement with the ratchet wheel and when the engine turns at a speed low enough to cause the pawls to engage the ratchet wheel, this engagement suddenly stresses the parts and produces a very noticeable shock which is very undesirable. Attempts have been made to overcome the sudden shock produced by the engagement of the one-way drive, but all such attempts result in extremely complicated, expensive structures requiring a very large space so that up to the present time a practical solution to this problem has not been provided.

One of the objects of the present invention is to overcome the above drawbacks by providing an extremely simple means, requiring but a small space, for limiting the turning moment transmitted from the driving member to the driven member of the clutch at speeds below that at which the clutch is engaged.

Another object of the present invention is to provide a moment limiting means of the above type which is inexpensive to manufacture.

A further object of the present invention is to provide a moment limiting means which does not increase the outer dimensions of the centrifugal clutch.

An additional object of the present invention is to provide a means for adjusting the turning moment with which the drive is transmitted from the driving to the driven members of the centrifugal clutch.

Also, it is an object of the present invention to incorporate the moment limiting means of the invention into a clutch which transmits the drive from the driving to the driven members resiliently so that the shock is reduced to an even greater extent with such an arrangement.

With the above objects in view the present invention mainly consists of a centrifugal clutch which includes a driving member adapted to rotate about a predetermined axis and a driven member located adjacent and coaxial with the driving member and being adapted to be driven by the driving member when the latter rotates at a speed above a given speed. A centrifugal one-way drive means is located with clearance about the driven member and engages the driving member to be automatically driven thereby when the driving member rotates at a speed below the given speed. A means interconnects the one-way drive means with the driven member for transmitting the motion of the driving member through the one-way drive means to the driven member and for limiting the turning moment applied to the driven member by the one-way drive means, and this means interconnecting the one-way drive means with the driven member is located between the latter and the one-way drive means.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 3 is a fragmentary, sectional view similar to Fig. 1 of a different embodiment of the structure of the invention.

Figure 1:
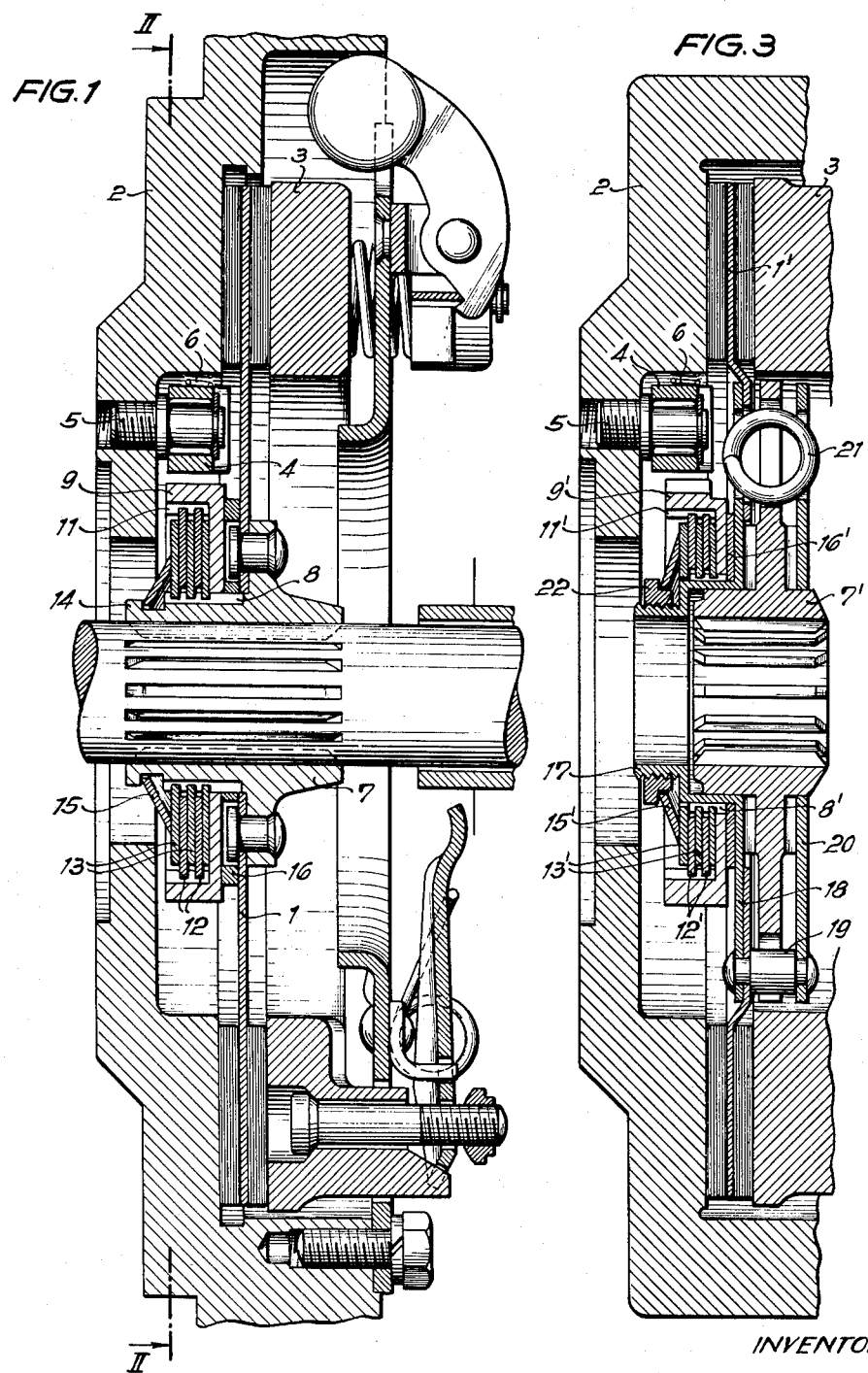
Fig. 1 is a fragmentary, sectional view taken along the line 1—1 of Fig. 2 in the direction of the arrows.
Figure 2:
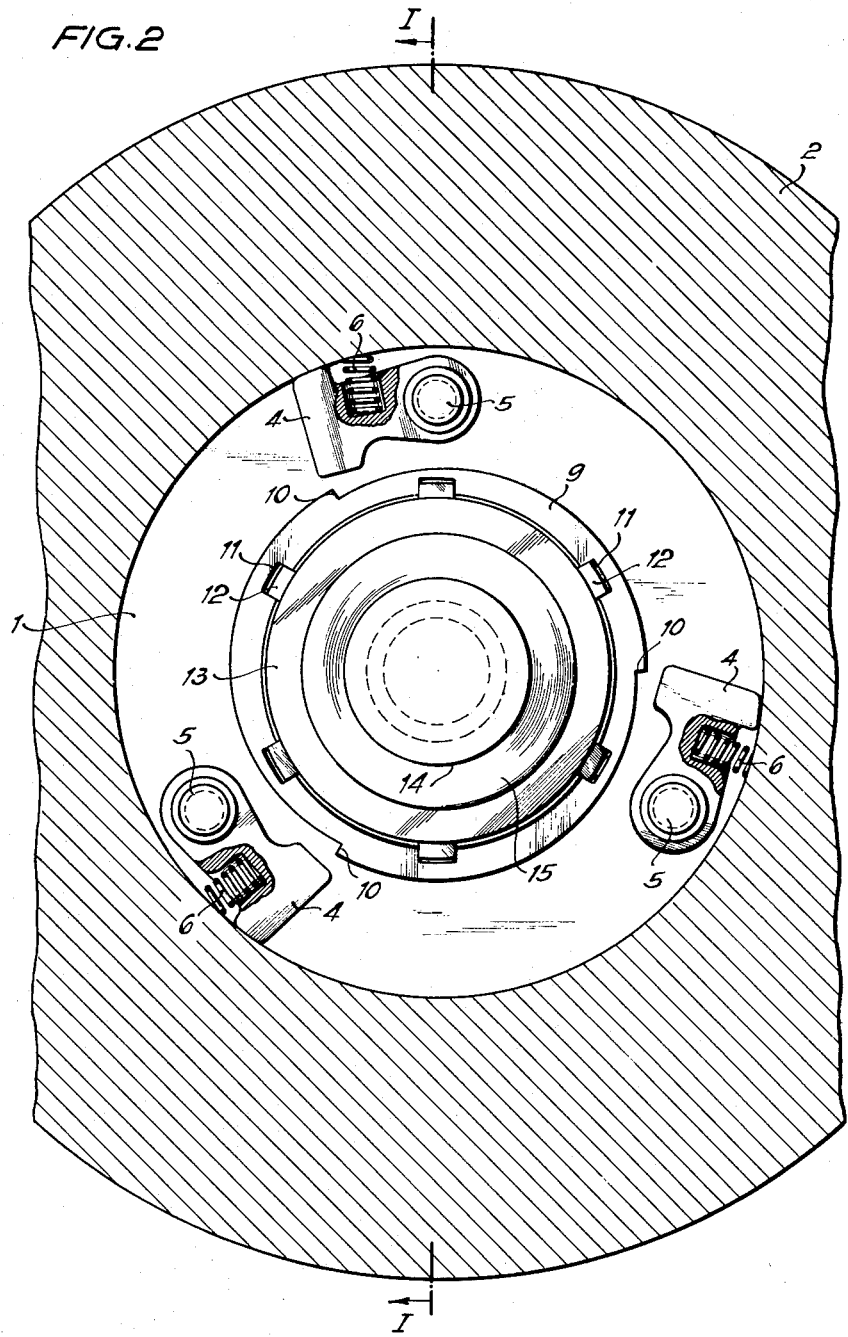
Fig. 2 is a fragmentary, sectional view taken along the line 2—2 of Fig. 1 in the direction of the arrows.

Referring now to Figs. 1 and 2, it will be seen that the centrifugal clutch includes a driven member 7 coaxial with the driving member 2. This driving member 2 may be the flywheel of the engine while the driven member 7 is connected in any suitable way to the wheels of the vehicle so that when members 2 and 7 are in driving engagement the wheels are connected to the engine. An annular disc 1 is fixed to the driven member 7 and carries at its opposite faces friction linings of any known suitable material which respectively engage the flywheel 2 and an annular pressure plate 3 carried by the flywheel 2. When the flywheel 2 turns at a given speed above its idling speed the structure shown at the top right portion of Fig. 1 automatically moves the pressure plate 3 toward the flywheel 2 with a force sufficient to cause the plate 1 to start to rotate with the flywheel 2 and to rotate therewith as the speed of the flywheel increases, this increasing speed of the flywheel urging the plate 3 toward the flywheel with an increasing force in a known way. The structure of the centrifugal clutch which urges the plate 3 toward the flywheel 2 so as to engage the clutch forms no part of the present invention and may take any known form.

With this arrangement it will be noted that at the idling speed of the engine and below the idling speed thereof and at the speeds between the idling speed and the speed at which the plate 1 starts to turn with the flywheel there is no connection between the engine and the wheels. As was pointed out above such a connection is desirable at relatively low speeds and when the engine is stationary, and in order to provide such a connection a ratchet wheel 9 is located freely about the driven member 7, this ratchet wheel 9 having ratchet teeth 10 at its outer periphery (Fig. 2) and having at its inner surface grooves 11 extending axially along the ratchet wheel.

Pivot pins 5 are carried by the flywheel 2 about the ratchet wheel 9, and these pivot pins 5 respectively support pawl members 4 for turning movement with respect to the driving member 2 into and out of engagement with the ratchet wheel 9, these pawls and the ratchet wheel 9 forming a one-way drive, as is evident from Fig. 2. Springs 6 engage the driving member 2 and the pawl members 4 to urge the latter into engagement with the ratchet wheel 10.

A transmission means is located between ratchet wheel 9 and driven member 7 to transmit the drive therebetween and to limit the turning moment with which this drive is transmitted. This transmission means includes the annular friction members 12 located about driven member 7 and surrounded by the ratchet wheel 9, these friction members 12 having projections respectively extending into the grooves 11 so that the friction members 12 are constrained to rotate with the ratchet wheel 9 but are movable axially therealong. The driven member 7 is formed at its outer surface with axially extending grooves 8, and additional friction members 13 alternate with the friction members 12 and are provided with inner peripheral projections extending into the grooves 8 so that the friction members 12 are constrained to rotate with driven member 7 and are axially movable therealong.

An annular springy member 15 forming part of a cone has its smaller left periphery, as viewed in Fig. 1, located within a groove 14 formed in the driven member 7, and the right periphery of member 15 engages the leftmost friction member 13 of Fig. 1. The rightmost friction member of Fig. 1 engages an annular portion of the ratchet wheel 9 which extends toward and about the driven member 7, so that the ratchet wheel 9 directly forms part of the slip clutch shown in Fig. 1, and the ratchet wheel 9 is located against an annular friction plate 16 which is fixed to the driven member 7. Thus, it is seen that the transmission from ratchet wheel 9 to the driven member 7 is formed by a slip clutch whose turning moment is limited by the force of spring 15.

Fig. 3 shows a centrifugal clutch similar to that of Figs. 1 and 2 and having the corresponding parts indicated with the same reference characters. Except for the differences pointed out below the structure of Fig. 3 is the same as that of Figs. 1 and 2. Referring to Fig. 3 is will be seen that the driven member 7' includes an outwardly extending annular portion formed with a cutout in which a spring 21 is located. The plate 1' is fixed by a rivet 19 to a plate 18 which is in turn fixed by the rivet 19 to a plate 20, these plates 18 and 20 being annular and located about the driven member 7' and the rivet 19 constraining the plates 18 and 20 as well as the plate 1' to rotate together. The rivet 19 is located in a peripheral cutout of the member 7'. Thus, it will be seen that when plate 3 is urged with a sufficient force toward the driving member 2, the drive will be transmitted from the plate 1' to the plates 18 and 20. These plates are formed with cutouts into which the spring 21 extends so that the drive is transmitted from the plates 18 and 20 through the spring 21 to the driven member 7', and in this way the transmission takes place in a very simple manner.

The friction plate 16' of Fig. 3 is fixed to the left side surface of plate 18, and this plate 18 is fixed to a tubular member extending freely about the driven member 7' and formed with the grooves 8' into which the projections of the friction plates 13' extend. Elements 4, 5 and 6 of Fig. 3 are identical with the corresponding elements of Figs. 1 and 2, and the ratchet wheel 9' of Fig. 3 cooperates in the same way with the pawl members 4 and extends freely about the tubular member fixed to the plate 18. The ratchet wheel 9' is formed with grooves 11' corresponding to grooves 11 and into which outer projections of friction plates 12' extend so that the embodiment of Fig. 3 is provided with a slip clutch similar to that of Figs. 1 and 2. The annular springy plate 15' of Fig. 3 is similar to the plate 15 of Figs. 1 and 2 and cooperates in the same way with the slip clutch. However, in Fig. 3 a stepped nut 22 threadedly engages the tubular member 17 fixed to the plate 18 and engages the left edge of the springy member 15' as viewed in Fig. 3, so that by turning the nut 22 on the tubular member 17 the force with which the spring 15' urges the friction plates 12' and 13' together and toward the right wall of ratchet wheel 9, as viewed in Fig. 3, as well as toward the friction plates 16' may be regulated.

The above described apparatus operates as follows:

With the embodiment of Figs. 1 and 2 it will be seen that when the engine is not operating the springs 6 maintain the pawls 4 in engagement with the ratchet wheel 9 so that the engine acts as a brake on the wheels when the engine is not operating.

The force of the springs 6 is such that when the engine is started up and approaches its idling speed the centrifugal force of the pawl members 4 is sufficient to compress the springs 6 so that the pawl members 4 move out of engagement with the ratchet wheel 9 before the idling speed of the engine is reached, this idling speed being, for example, 300 R. P. M., and it will be noted that the compression of the springs 6 is limited by the engagement between the pawls 4 and the flywheel 2. Thus, during operation of the engine the one-way drive provided by the pawls and ratchet wheel is disconnected and this one-way drive only operates when the speed of the motor is below its given idling speed of, for example, 300 R. P. M.

The embodiment of Fig. 3 operates in the same manner except that the transmission of the drive from the ratchet wheel 9' and from the slip clutch goes through the spring 21, so that with the embodiment of Fig. 3, the smoothness of the operation when the one-way drive is engaged is guaranteed to an even greater extent than with the embodiment of Figs. 1 and 2.

It is desirable to choose for the material of the friction members 12, 13, 12', 13', 16 and 16' a substance having as little friction variations as possible. A particularly suitable substance for these friction members is a sintered metal, and sintered bronze having a high graphite content is especially preferred.

Instead of the arrangement described above, it is possible to provide the one-way drive and the slip clutch between the pressure plate 3 and the driven member 7 or 7'. Also, a one-way drive different from the pawl and ratchet arrangement disclosed may be used with the invention, and instead of a slip clutch other moment limiting structures such as structure using wedges or flyweights may be used.

It will be noted that with the above described structure not only are very simple, inexpensive elements used, but in addition the arrangement of the slip clutch within the area surrounded by the ratchet wheel provides an extremely compact assembly requiring no more space than a conventional centrifugal clutch.

The device of the invention in addition to being suitable for centrifugal clutches may be used in any other clutches which are intended to provide an automatic connection between the driving and driven members below a given speed or which do not provide sufficient transmitting power at such low speeds, as for example, in a hydrodynamic clutch.

It will be understood that each of the elements described above, or two or more together, may also find a useful application in other types of centrifugal clutches differing from the types described above.

While the invention has been illustrated and described as embodied in transmissions for use in centrifugal clutches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; a plurality of pawls turnably carried by said driving member about said ratchet wheel for movement into and out of engagement therewith; spring means engaging said driving member and said pawls for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member.

2. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member.

3. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member, said slip clutch means including a spring means for transmitting the drive between said slip clutch means and driven member so as to transmit the drive smoothly from said ratchet wheel to said driven member when said pawl engages said ratchet wheel.

4. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; slip clutch means located about said driven member between the latter and said ratchet wheel and interconnecting said ratchet wheel and driven member for limiting the turning moment transmitted from said ratchet wheel to said driven member; and adjusting means engaging said slip clutch means for adjusting the same to set said turning moment at a desired value.

5. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member, said slip clutch means being formed in part by an annular hub portion of said ratchet wheel.

6. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member, said slip clutch means including friction members made of sintered metal.

7. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; a ratchet wheel located about and rotatable relative to said driven member adjacent said driving member; at least one pawl turnably carried by said driving member at the exterior of said ratchet wheel for movement into and out of engagement therewith; a spring means engaging said driving member and said pawl for urging the latter into engagement with said ratchet wheel only at relatively low turning speeds of said driving member substantially below said given speed; and slip clutch means located about said driven member between the latter and said ratchet wheel and interconnecting said ratchet wheel and driven member for limiting the turning moment transmitted from said ratchet wheel to said driven member, said slip clutch means including friction members made of sintered bronze having a high graphite content.

8. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed; centrifugal one-way drive means located about and rotatable relative to said driven member and engaging said driving member to be automatically driven by said driving member when the latter rotates at a speed below said given speed; and means interconnecting said one-way drive means with said driven member for transmitting the motion of said driving member through said one-way drive means to said driven member and for limiting the turning moment applied to said driven member by said one-way drive means, said means interconnecting said one-way drive means with said driven member being located between said one-way drive means and said driven member.

9. In a centrifugal clutch, in combination, a driving member adapted to rotate about a predetermined axis; a driven member located adjacent and coaxial with said driving member; means for transmitting a drive to said driven member from the driving member when the latter rotates at a speed above a given speed, said driven member being formed in its outer surface with a plurality of recesses distributed about the turning axis of said driven member; a plurality of annular friction members extending about said driven member and having projections extending respectively into said recesses so that said friction members are constrained to rotate with said driven member but are axially movable therealong; an annular ratchet wheel located about said friction members and having an inner peripheral surface directed toward said friction members and formed with axially extending recesses distributed about said predetermined axis; additional annular friction members respectively alternating with said first mentioned friction members and having at their outer peripheries projections extending into said recesses of said ratchet wheel so that said additional friction members are constrained to rotate with said ratchet wheel and are freely movable axially along the same; means urging said friction members together with a predetermined force; a plurality of pawls turnably carried by said driving member and located about said ratchet wheel for movement into and out of engagement with the same; and spring means engaging said pawls to urge the same toward said ratchet wheel.

10. In a centrifugal clutch, in combination, a driving member having a predetermined axis of rotation; a driven member coaxial with said driving member, said driven member having a hub and an annular plate portion fixed to and extending outwardly from said hub and formed with at least one cutout; means for transmitting a drive to said driven member from the driving member when the latter rotates at a speed above a given speed; a pair of plates respectively located on opposite sides of said annular plate portion and extending about said hub of said driven member, said plates being interconnected for rotation together and at least one of said plates being formed with a cutout located opposite said cutout of said annular plate portion; a spring located between said one plate and annular plate portion and extending into said cutouts thereof so that turning movement may be transmitted from said plates to said driven member through said spring; an annular member fixed to one of said plates, extending therefrom toward said driving member, being coaxial with said driving and driven members, and having an outer surface portion formed with axially extending grooves distributed about said predetermined axis; a plurality of first annular friction members extending about said annular member and having projections extending into said grooves thereof; a ratchet wheel extending about and rotatable relative to said first friction members and having an inner surface directed toward said first friction members and formed with axially extending grooves distributed about said predetermined axis; a plurality of second annular friction members alternating with said first friction members and having outer projections extending into said grooves of said ratchet wheel; means urging said friction members together with a predetermined force; a plurality of pawls turnably carried by said driving member about said ratchet wheel for movement into and out of engagement therewith; and spring means engaging said driving member and said pawls for urging the latter toward said ratchet wheel.

References Cited in the file of this patent
UNITED STATES PATENTS

| | | |
|---|---|---|
| 1,926,783 | Miller | Sept. 12, 1933 |
| 2,001,931 | Lyman | May 21, 1935 |